United States Patent [19]

Sharp et al.

[11] Patent Number: 4,485,563
[45] Date of Patent: Dec. 4, 1984

[54] BOREHOLE SURVEY INSTRUMENT

[75] Inventors: Harper E. Sharp; John W. Linn, III, both of Houston; Emil S. Macha, Stafford; Miles A. Smither, Houston, all of Tex.

[73] Assignee: Wilson Industries, Inc., Houston, Tex.

[21] Appl. No.: 446,629

[22] Filed: Dec. 3, 1982

[51] Int. Cl.³ ............... E21B 47/022; G01D 9/42
[52] U.S. Cl. ............................. 33/314; 33/313; 175/45
[58] Field of Search .......... 33/309, 310, 313, 314, 33/364, 366; 175/45

[56] References Cited

U.S. PATENT DOCUMENTS

| | | | |
|---|---|---|---|
| 2,120,670 | 6/1938 | Hyer | 33/313 |
| 2,195,224 | 3/1940 | Opocensky | 33/314 |
| 2,644,242 | 7/1953 | Hewitt, Jr. | 33/314 |
| 2,756,511 | 7/1956 | Young | 33/314 |
| 3,100,350 | 8/1963 | Brown | 33/313 |
| 4,153,120 | 5/1979 | Zuvela et al. | 175/45 |
| 4,171,578 | 10/1979 | Meador | 33/314 |
| 4,393,598 | 7/1983 | Powell et al. | 33/314 |

Primary Examiner—Richard R. Stearns
Attorney, Agent, or Firm—Hubbard, Thurman, Turner & Tucker

[57] ABSTRACT

A borehole survey instrument is provided having a meniscus type floating compass member with indicia thereon for indicating azimuth and inclination. A light source is disposed below the indicia for illuminating the indicia upward through the liquid through which the meniscus type floating compass member floats. A lens system is provided for focusing the image of the illuminated compass member upon a film disposed below the compass member. This arrangement permits the centering post for the compass member to be of minimum diameter consistent with rigidity requirements and permits a high angle compass member to indicate angles of inclination approaching ninety degrees. A multiple light bulb light source is utilized and each light bulb is mounted in a manner which permits a single light bulb to illuminate the entire compass member. A hand-held programming and diagnostic unit is provided which may be momentarily electrically mated with the borehole survey tool to input a programmed timed delay and diagnostically test both the condition of the light bulbs utilized as the illumination source and the state of the batteries within the instrument. This hand-held programmable unit eliminates all the mechanical programming switches and permits the instrument to be completely sealed from the pressure, fluids and contaminants normally found in a well bore.

29 Claims, 15 Drawing Figures

BOREHOLE SURVEY INSTRUMENT

This invention relates generally to borehole survey instruments and more particularly relates to photographic type survey instruments for determining the inclination and direction of inclination of a borehole.

There are many instances when it is very important to determine the location of a wellbore relative to a vertical line projected through the well site. This is particularly true in the petroleum industry where deep boreholes can diverge dramatically from a vertical projection of the point of entry into the earth. Further, there are many instances where it is desired to cause the borehole to purposely deviate at relatively high angles in order to reach deep strata displaced horizontally from the well site. Prime examples of this need are in offshore production where a large number of highly divergent wells are typically drilled from a single platform in order to produce fluids from a large area using a single drilling and production platform. Directional drilling capabilities have been increased to the point where even a deep wellbore can be drilled along a desired path to arrive at a preselected subterranean location. Such techniques typically employ a hydraulic mud motor mounted on the end of specialized drill collars, i.e., bent subs, on the drill string which is held stationary as the bit is rotated by the motor.

However, in order to effectively accomplish such directional drilling, it is necessary to ascertain the current location of the bit, i.e., deviation and direction of deviation at the depth, and to also ascertain the current attitude, i.e., the inclination to the vertical and the azimuthal direction of the inclination of the borehole, and more specifically of the drill string and thus the bit at or near the bottom of the borehole. The location of the borehole at any given depth can be determined generally by knowing the angle and inclination of the borehole at a series of depth stations and computing the ultimate location using a dead reckoning computation.

For many years, the most common instruments for measuring the angle and direction of deviation of a borehole have utilized a photographic system to record the position of an indicator which is responsive to both magnetic north and gravity. These instruments have been commonly referred to as single shot or multi shot units. In a typical operation of a single shot unit, the instrument is dropped or lowered on a wireline into the drill string until the instrument has been positioned in a predetermined orientation in a receptacle near the bottom of the drill string. The instrument contains a magnetic compass device which remains in a horizontal position as a result of either a pendulous or liquid suspension, and is simultaneously rotated magnetically to north. The compass device is marked with indicia indicating both degrees of azimuth and degrees of angle of inclination from the vertical. A photographic film fixed to the housing is then exposed through a lens system to record the relative position of a reticle fixed to the housing of the instrument to the reference indicia on the compass member, thus recording the degree of inclination and the azimuthal orientation of the instrument housing, and therefore of the drill string and hence the borehole at that depth. The single photographic record is then retrieved either by a wireline, or when the drill string is removed to replace the bit, the film is developed, and the attitude of the borehole determined. This round trip, single shot precedure is often doen at repeated intervals during the drilling of the wellbore so that the attitude of the borehole at various depths can be recorded as the borehole is drilled. If an adequate number of such data points are available, the position of the borehole can be determined with some accuracy using dead reckoning computations.

A multi shot instrument is very similar in operation to the single shot instrument except that a large number of photographs are taken of the reference indicia at predetermined time intervals. In such a case, the instrument is typically allowed to free fall or be pumped to the bottom of the borehole prior to withdrawing the drill string. As a result, the pictures taken each time the drill string is stopped to be disconnected, typically at ninety foot intervals, provide a series of deviation and azimuth readings at the ninety foot intervals along the borehole. The location of the borehole along its entire length can then be determined using dead reckoning calculations.

These borehole survey instruments must be of sufficiently small diameter to be inserted through a typical drill string, and generally speaking, must be less than about one and one-quarter inch in outside diameter. Additionally, these instruments must be disposed in high pressure containers which means that the angle and azimuth indicating means and photographic means must be very small in diameter. In order to obtain the accuracy desired, it is vital that the angle and azimuth indicating means be very accurate and have very accurately scribed, preferably very thin and uniform lines on the surface. Further, the lens and photographic system must record this small, very fine line image clearly in order to facilitate accurate interpolation of the angle data. In addition, the time of exposure should be as short as possible because any vibration or movement of the unit during the exposure period results in a degradation of the recorded data.

There have previously been two general types of azimuth and deviation indicating means. The first utilizes a pendulous mounting to mechanically support a magnet compass member in such a manner that gravity produces a vertical reference and the earth's magnetic field rotates the compass for azimuth information. These devices typically utilize a jewel-type bearing supporting a needle point. The harsh environment to which the device is subjected typically deteriorates the mechanical bearing support and needle point and results in erratic positioning and loss of the desired precision. Superior accuracy and reliability is provided by meniscus type devices utilizing a magnetic compass member which floats in a liquid to allow essentially friction free movement in both inclination and azimuth. This type of device requires a vertically depending post to precisely position the compass member on the optical centerline while permitting essentially free, three axis movement. In devices of this type, light has previously been passed from a multiple bulb source down through a column of air, through the center post, through the liquid, through a transparent compass member, again through the liquid, through a transparent wall in the fluid chamber, and finally through a lens system to the film. As a result of light passing through the interfaces between the large number of different parts each having different densities and light transmission characteristics, substantial reflection and refraction of the light waves occur resulting in reduced accuracy of location of the image and quality of the photographic image, which, in turn, reduces the accuracy with which the angle data can be determined.

Prior art devices have required extremely skilled technicians to run the tools and interpret the data. The technician must operate in extremely unfriendly environments of heat, cold, noise, filth and hazard to his person while performing tasks which require significant attention to detail. It is of utmost importance for the operator to perform his task in an efficient and reliable manner so as to minimize down time of the very expensive drilling rigs and crew, and prevent, if at all possible, a trip into the wellbore which collects no data, thus requiring another run. In addition, such tools have large number of failure modes which must be minimized, including: the process of loading film into the carmera; setting in the desired delay time before the film is exposed to the image of the angle and azimuth indicator; and, determining the freshness and operativeness of the batteries and bulbs used to operate the system and record the data. Further, prior systems have utilized mechanical thumb operated encoding switches mounted on the probe to program the time delay necessary to allow the tool to reach the bottom of the drill string. Such mechanical encoding switches which require an undesirable penetration of the pressure vessel are subject to failure due to contamination from well fluids, physical damage or vibration, any one of which can result in a failure to collect data. The photographic system on prior instruments have typically required three light bulbs to obtain the desired light level to expose the film in a reasonably short time. The loss of one of these bulbs has typically resulted in materially degraded exposures, frequently to the point where the data is unreadable.

The object of the present invention is to provide a photographic type borehole survey instrument which has improved accuracy and reliability with respect to the range of measurements, human operability and mechanical, electrical and photographic reliability.

More specifically, an important object of the present invention is to provide a survey instrument having an improved photographic recording system which produces greater accuracy, readability and reliability and which is useful in both single and multi shot tools.

Still another important object of the present invention is to provide a well survey tool having an improved photographic system which can be fabricated with interchangeable parts for improved economy while still maintaining the desired accuracy.

Another object of the present invention is to provide an improved photographic system for a well survey instrument utilizing a meniscus type compass member which permits the measurement of greater deviation angles, i.e., angles approaching ninety degrees.

Still another object of the present invention is to provide an improved photographic system which will continue to produce quality photographic records in the event one or two light bulbs fail.

A further object of the invention is to provide a more reliable well survey instrument by providing a self-diagnostic capability to detect likely failure modes prior to committing the tool to the borehole.

Yet another object is provide an improved tool in which the operator can conveniently program delay times and determine the operability of the probe power supply and light source.

Still another important object of the present invention is to provide an instrument in which mechanical switches accessible through the pressure vessel are eliminated from the probe to provide improved reliability.

These and other objects are accomplished in accordance with the present invention by providing a meniscus type floating compass member for indicating azimuth and inclination, providing a light source disposed below the indicia for illuminating the indicia upwardly through the liquid in which the member floats, and providing a lens system for focusing the image of the illuminated compass member upon a film disposed below the compass member. This arrangement allows the centering post for the compass member to be of minimum diameter consistent with rigidity permitting the hemispherical high angle compass member to indicate angles approaching ninety degrees. Other objects of the invention are accomplished by utilizing a solid column of transparent material such as glass to form substantially the entire light path between the image of the compass member and the focusing lens to thereby substantially eliminate refraction and reflection of the light between the image and the lens. In preferred embodiments, the material has a refractive index closely matching that of the liquid surrounding the indicia to minimize if not eliminate any reflection or refraction at the interface therebetween. Further, the lower end of the material is preferably formed into the focusing lens to also provide the desired magnification of the image as it is projected onto the film. Further, the transparent material is preferably configured so that a multiple bulb light source disposed around the circumference of the photographic axis is properly diffused and scattered to uniformly illuminate the indicia scribed on the compass member. The increased size of the light transmission path, i.e., substantially the entire cross sectional diameter of the barrel as contrasted with a minimum hole through the centering post, provides efficient light levels on the indicia to enhance the photographic process. The efficient light levels produced by the light source and clarity of the photographic records enhances the ability of the system to utilize a multiple bulb light source normally operating at a reduced voltage level with increased voltage levels being automatically established in the event of one or more bulb failures to maintain the light level reaching the film within an acceptable range for good exposures.

The cost of the device is reduced while maintaining accuracy by utilizing O-rings as centering devices in the assembly of precision machined and scribed individual parts in order to precisely align the parts along the measurement and optical axis of the tool.

The invention also contemplates a hand-held programming and diagnostic unit which can be momentarily mated with the tool to input a programmed time delay and diagnostically test both the condition of the bulbs used as the light source in the photographic process and the state of the batteries providing the power supply for the instrument. The hand-held programmable unit thus eliminates the mechanical programming switches and the mechanical switches necessary for the diagnostic testing from the probe, thus permitting the probe to be completely sealed from pressure fluids and contaminants, and to be immunized from mechanical vibration and damage.

In accordance with another aspect of the invention, the intensity of the light produced by each bulb is automatically increased to compensate for the failure of one or more of multiple bulbs so that the exposure time can continue to be a desired short interval to minimize the effects of motion of the angle detector.

The novel features believed characteristic of the invention are set forth in the appended claims. The invention itself, however, as well as other objects and advantages thereof, may best be understood by reference to the following detailed description of illustrative embodiments, when read in conjunction with the accompanying drawings, wherein:

Figure 5A:
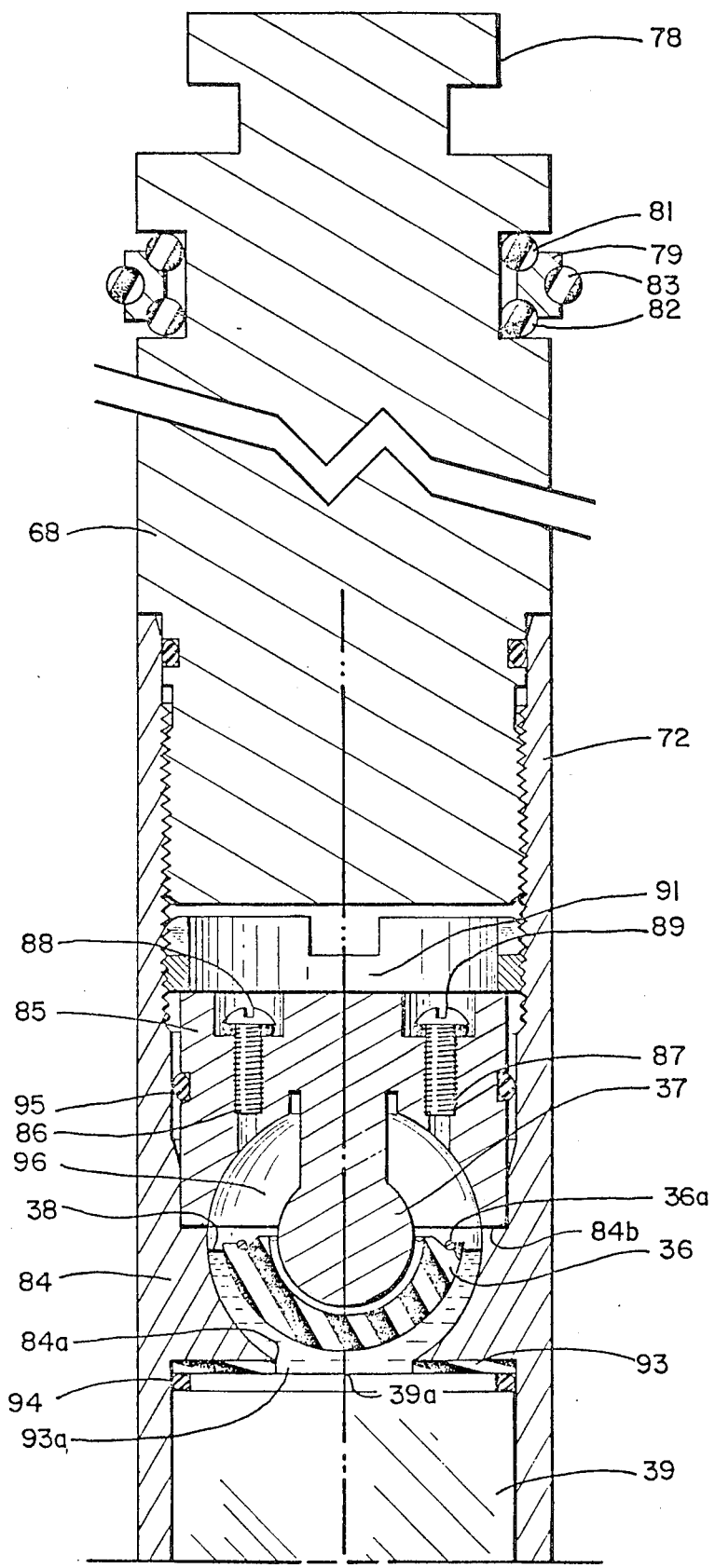
Figure 5B:
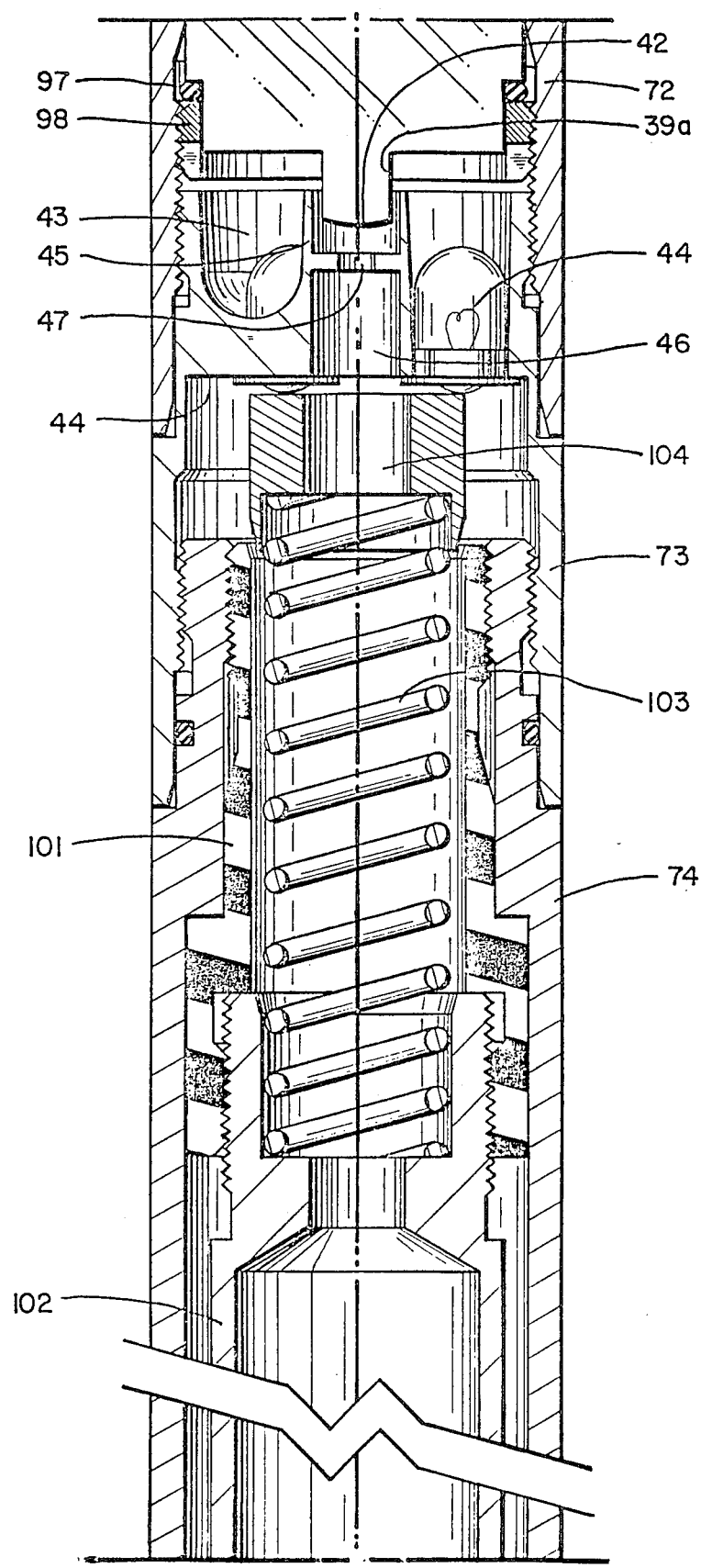
Figure 5C:
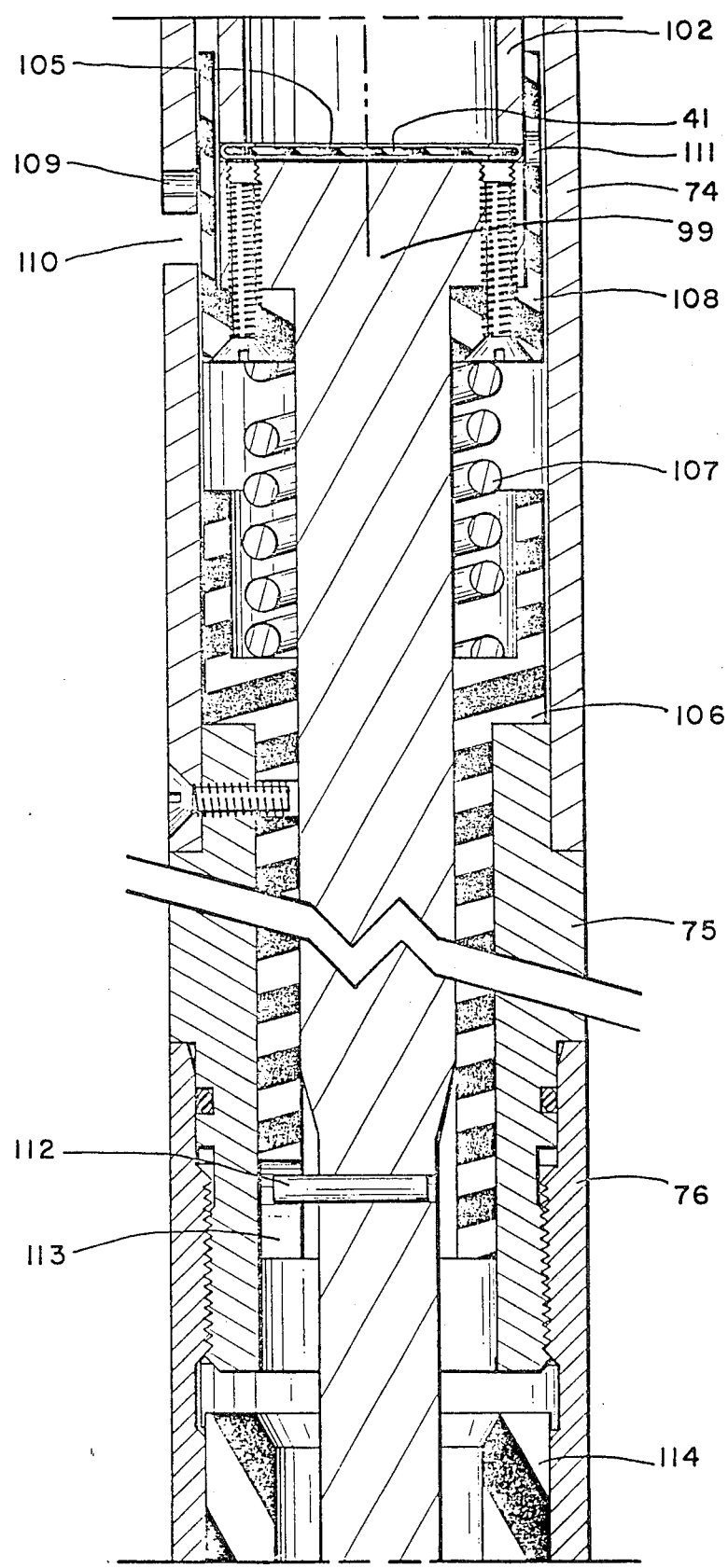
Figure 5D:
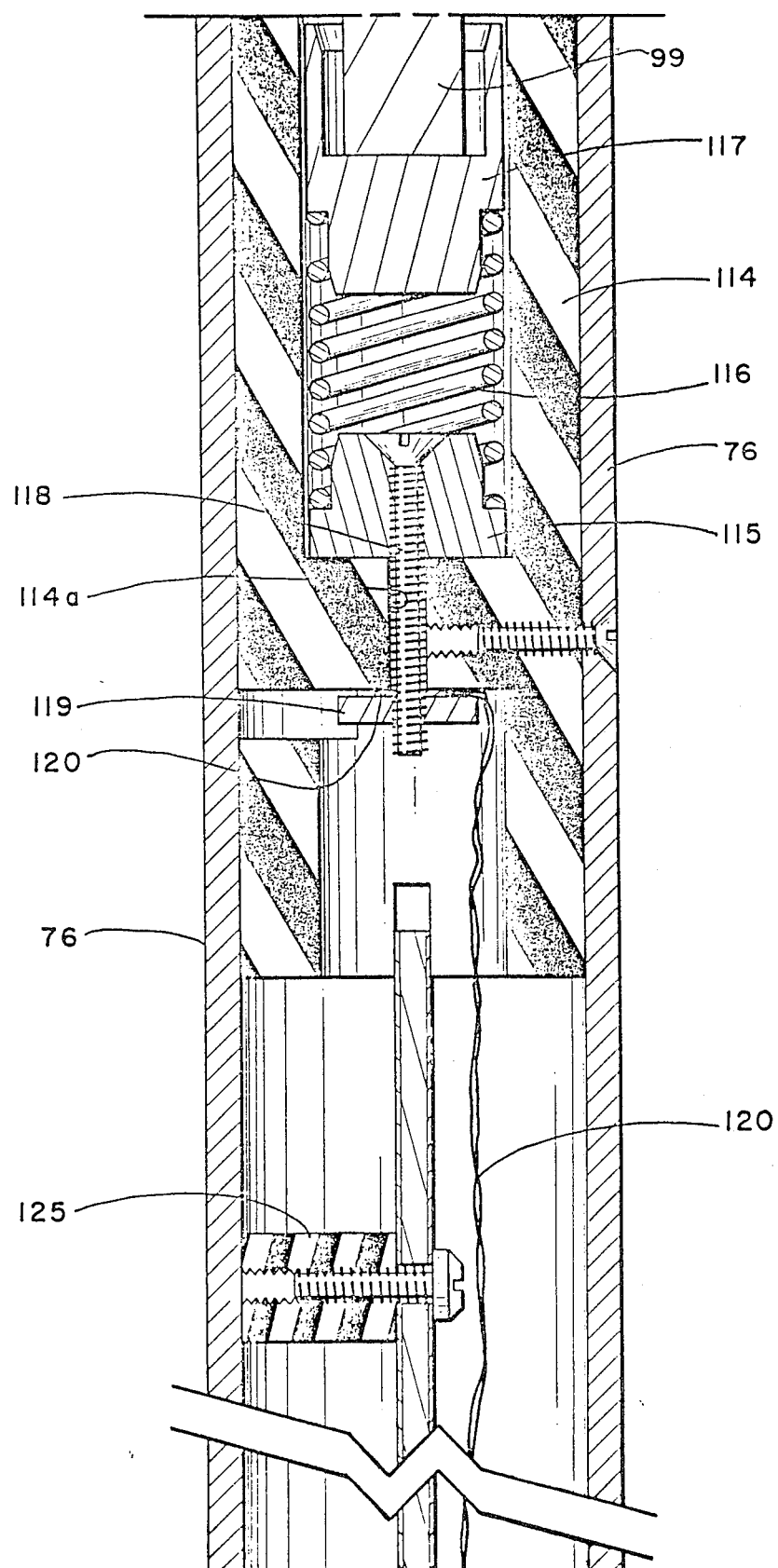
Figure 5E:
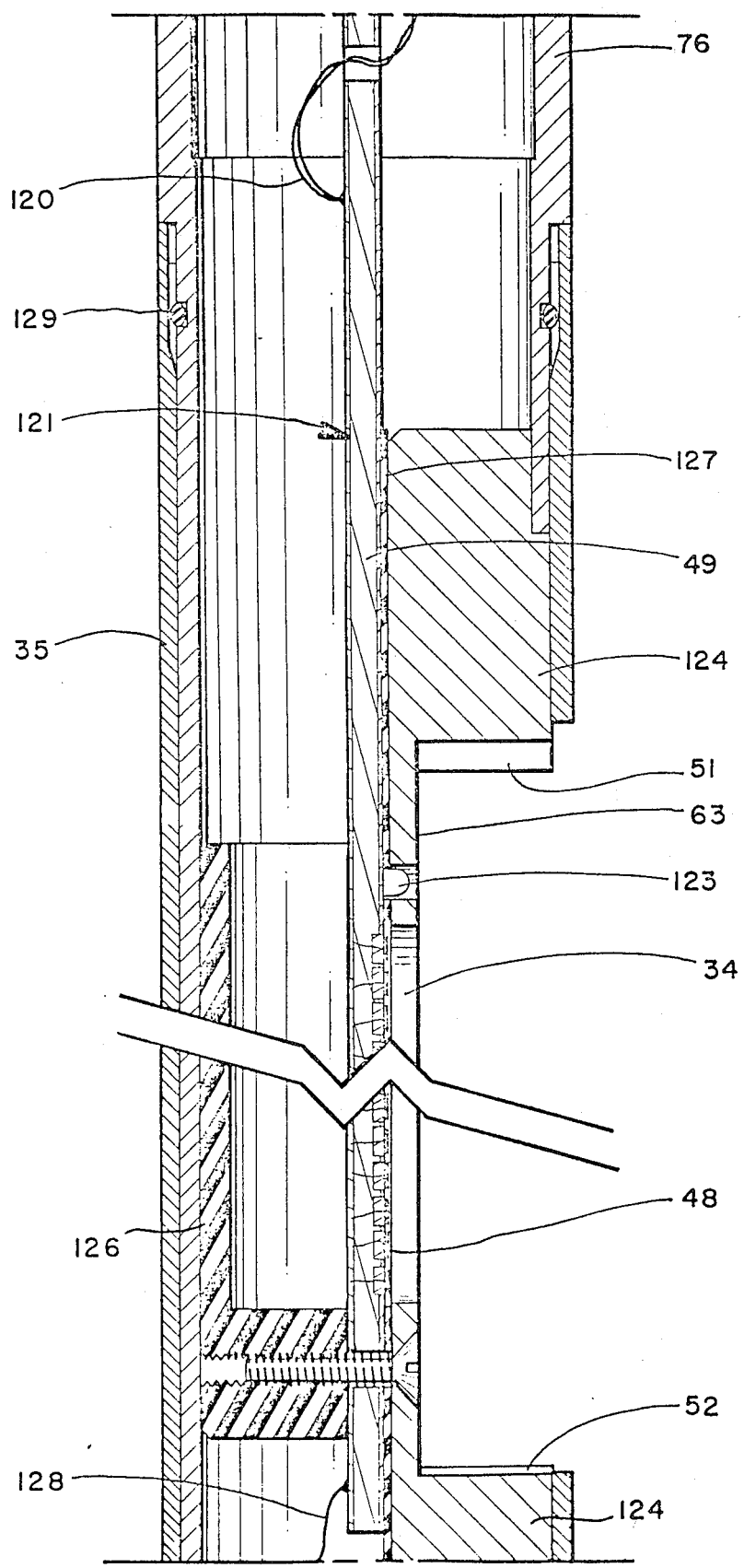
Figure 5F:
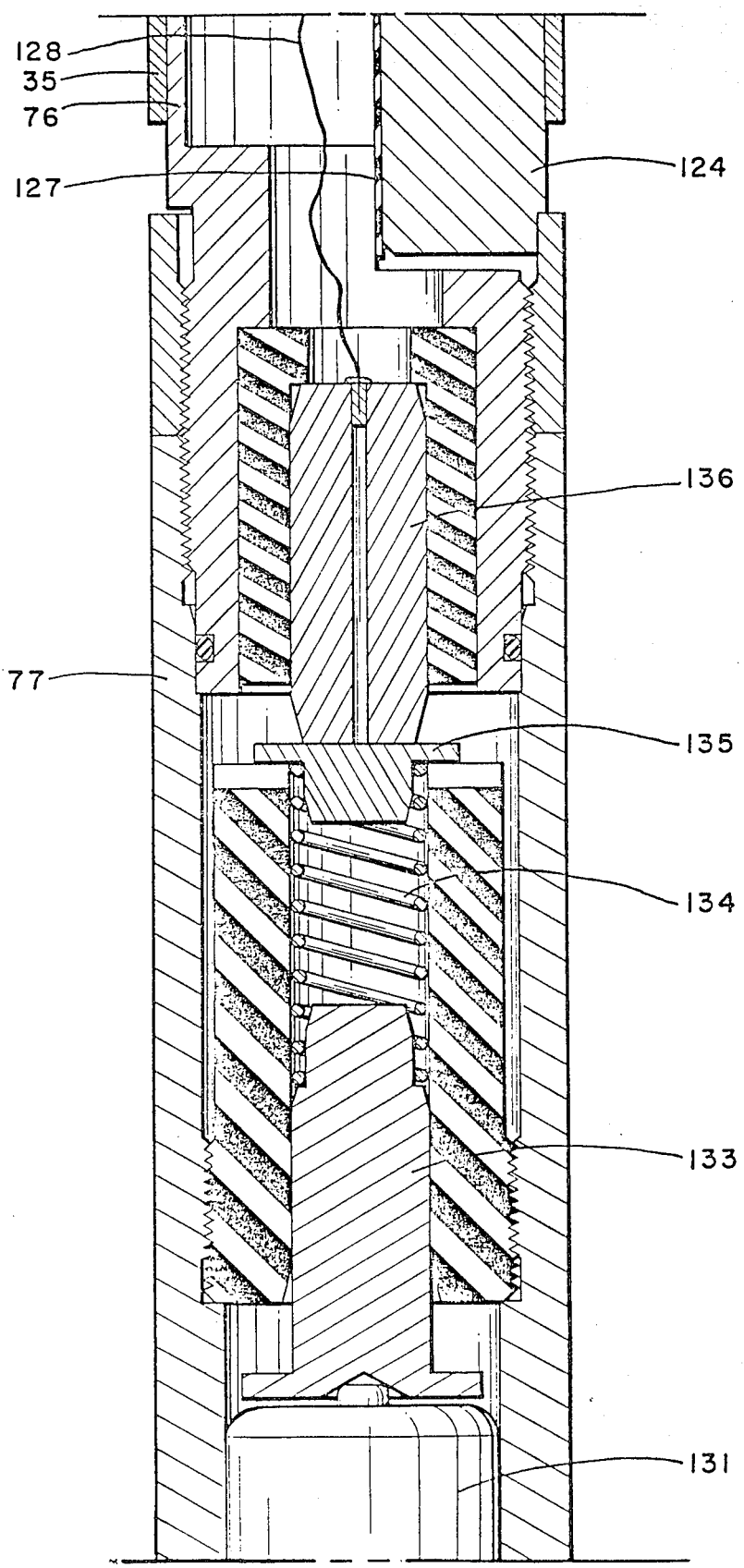
Figure 5G:
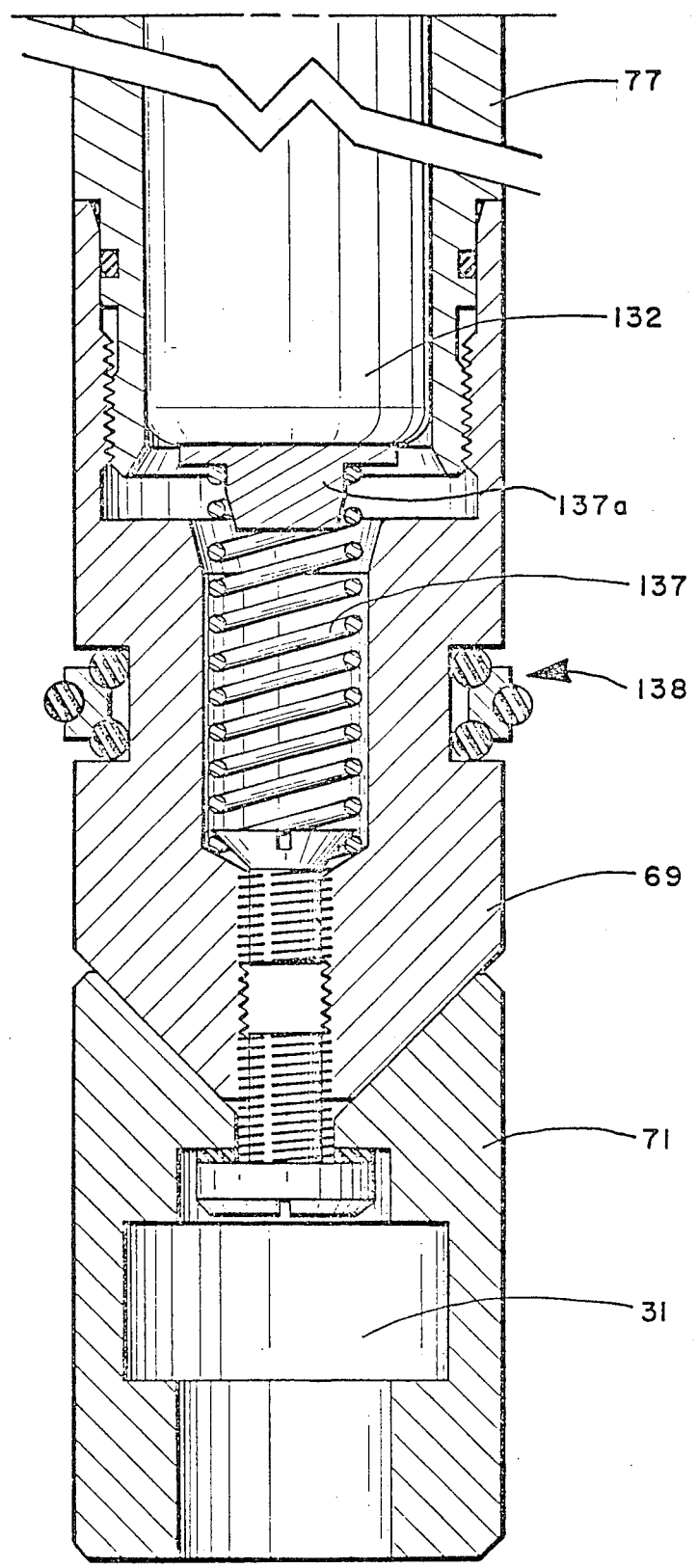
Figure 6:
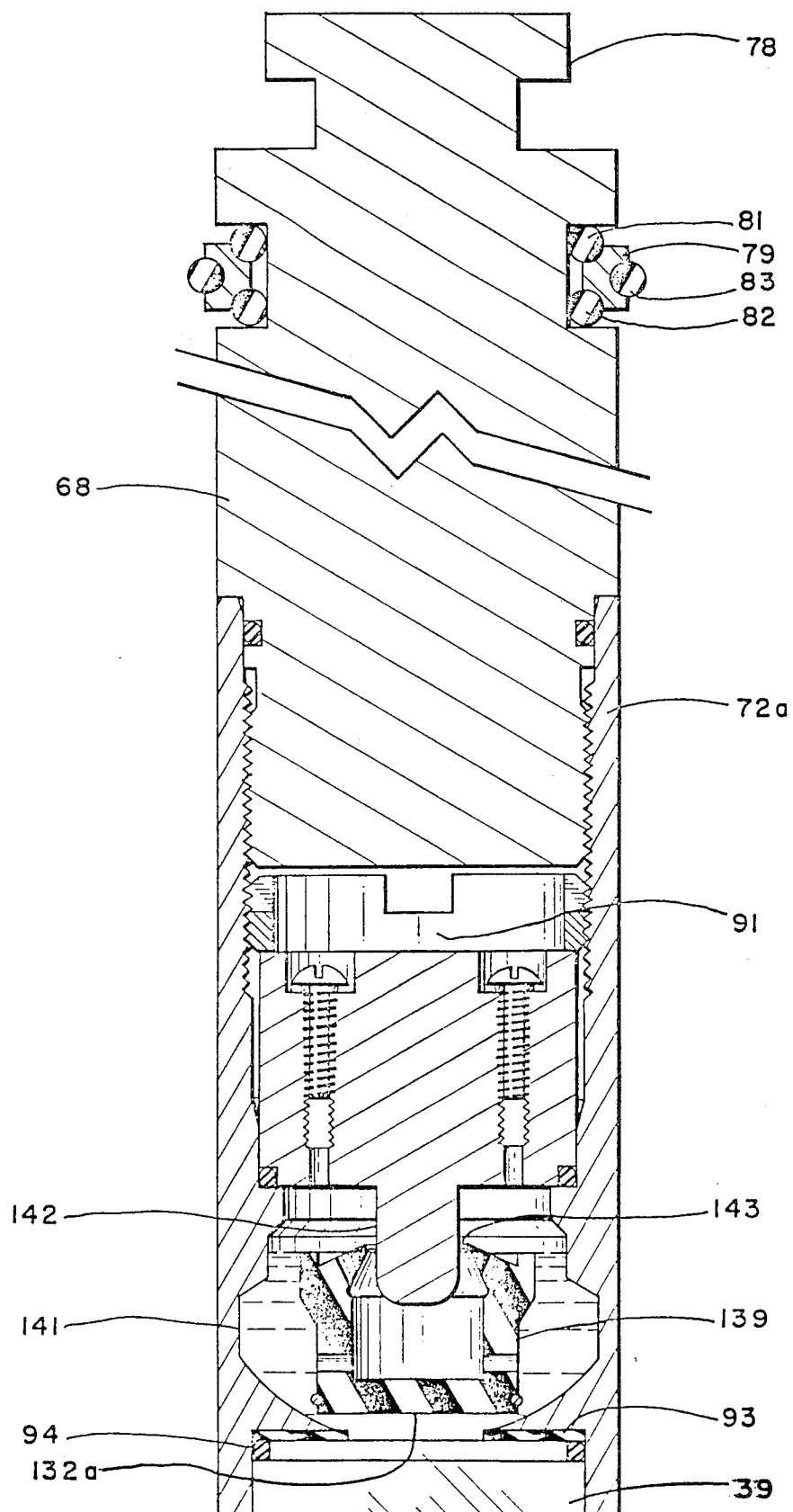

FIGS. 5A through 5G, in combination, provide a longitudinal sectional view, partially broken to shorten the illustrations, which illustrate a survey instrument having a high angle measurement unit constructed in accordance with this invention;

FIG. 6 is a view similar to FIG. 5A showing a low angle measurement unit for substitution in the instrument of FIGS. 5A–5G.

Figure 7:
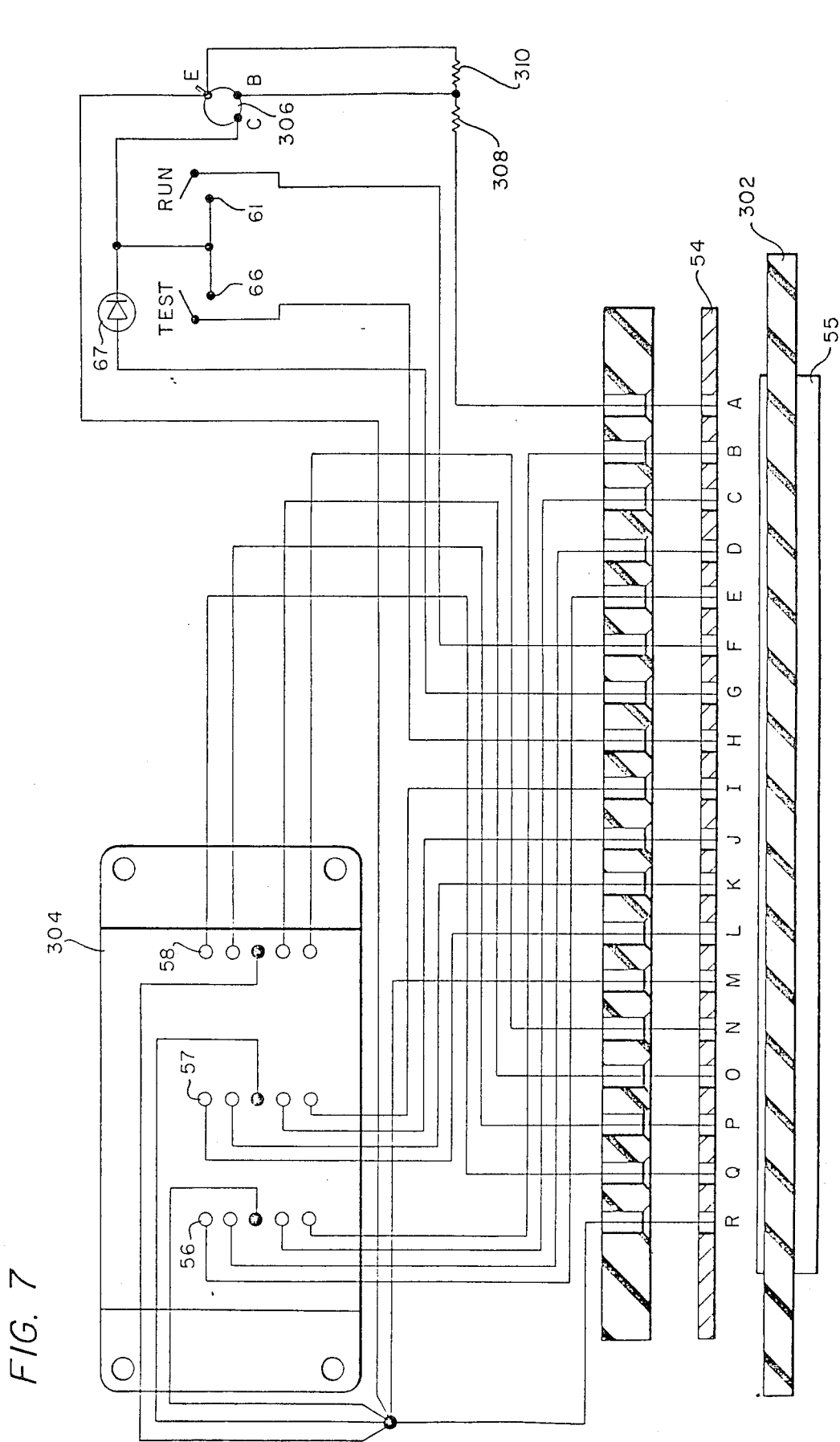
Figure 8:
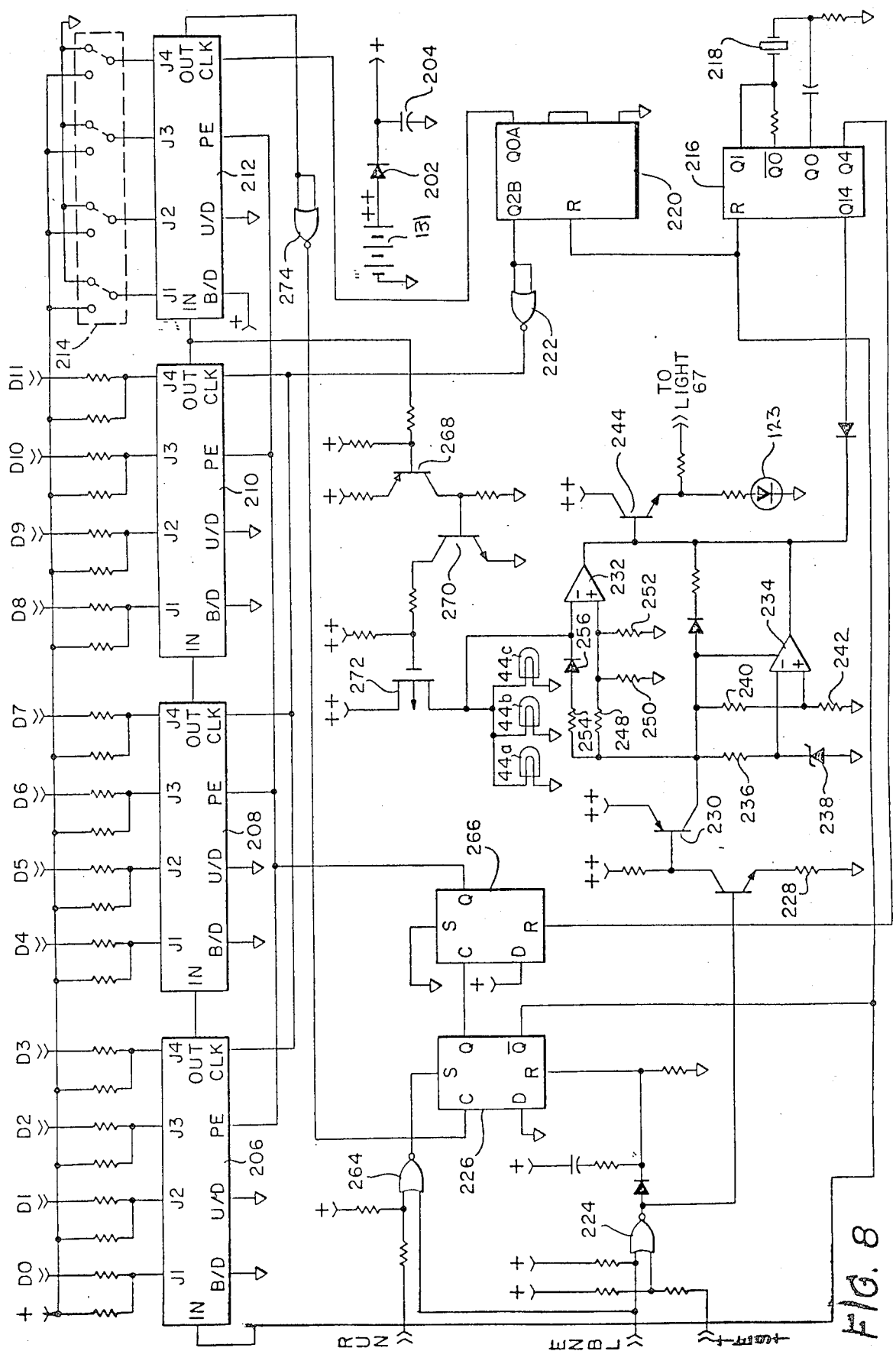

FIG. 7 is a schematic diagram of the circuitry of the programming and test unit of this invention; and FIG. 8 is a schematic diagram of the timing and test circuitry of the borehole survey instrument of the present invention.

Figure 1:
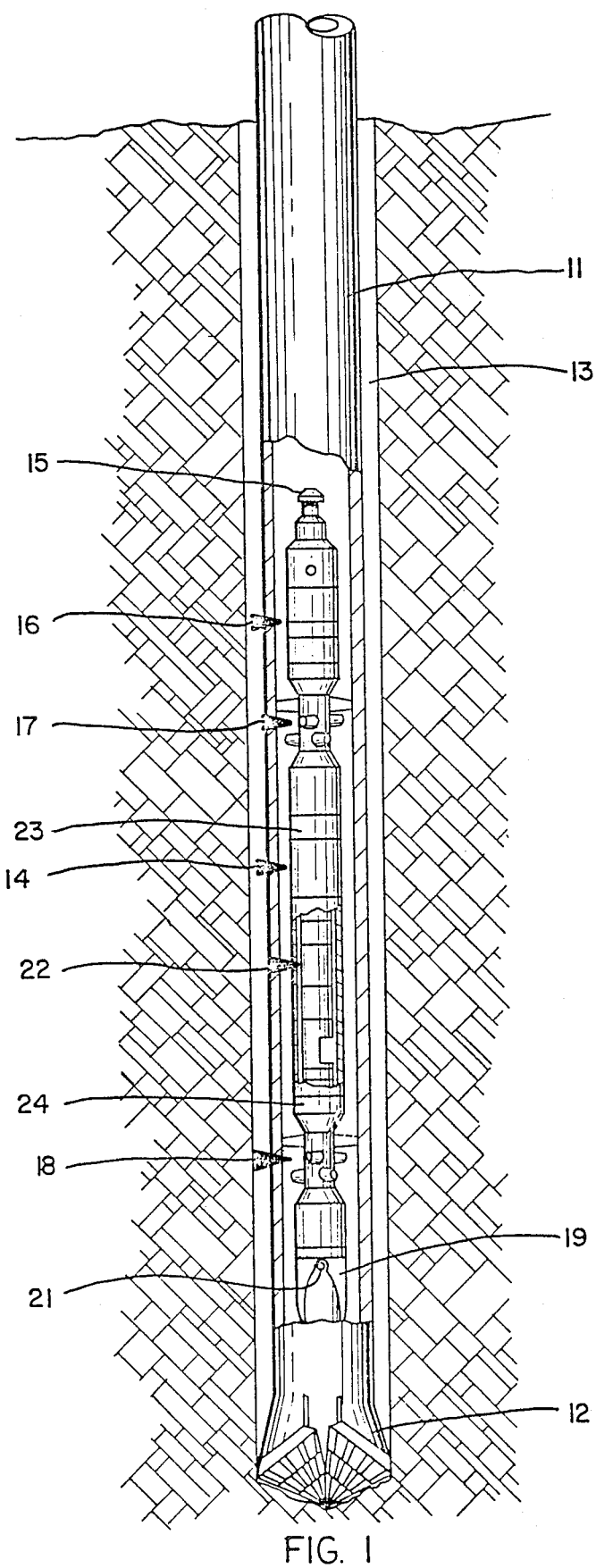
FIG. 1 is a schematic illustration of a wellbore with a drill string and survey instrument therein with a portion of the drill string broken away to illustrate the pressure barrel assembly, and a portion of the pressure barrel broken away to illustrate a survey instrument in accordance with this invention.

Referring first to FIG. 1, a drilling string 11 having bit 12 on the lower end thereof is shown in well 13.

A pressure barrel indicated generally at 14 is landed in the lower end of the drill string. The pressure barrel has a spear point 15 at its upper end for connection to a wireline running tool, not shown, for running and retrieving the entire tool. At the upper end of the pressure barrel a swivel assembly indicated generally at 16 provides for relative rotation between the wireline and the remainder of the tool.

Upper and lower centralizers indicated generally at 17 and 18 are provided by a plurality of radially extending axially and circumferentially spaced rubber fingers to centralize the pressure barrel within the drill string.

At its lower end, the pressure barrel is provided with a mule shoe 19 which cooperates with a key 21 carried by the drill string to orient the pressure barrel relative to the drill string. The lower end of the drill string 11 will usually include a bent sub for directional drilling. The lower portion of the bent sub is at a slight angle to the remainder of the drill string and the mule shoe provides for orientation of the pressure barrel in predetermined position relative to the high side of the drill string.

The survey instrument indicated generally at 22 is mounted within the pressure barrel by conventional shock absorbing means which are not shown but which are positioned within the sections 23 and 24 of the tool to protect the instrument during running and landing of the pressure barrel within the drill string.

Figure 2:
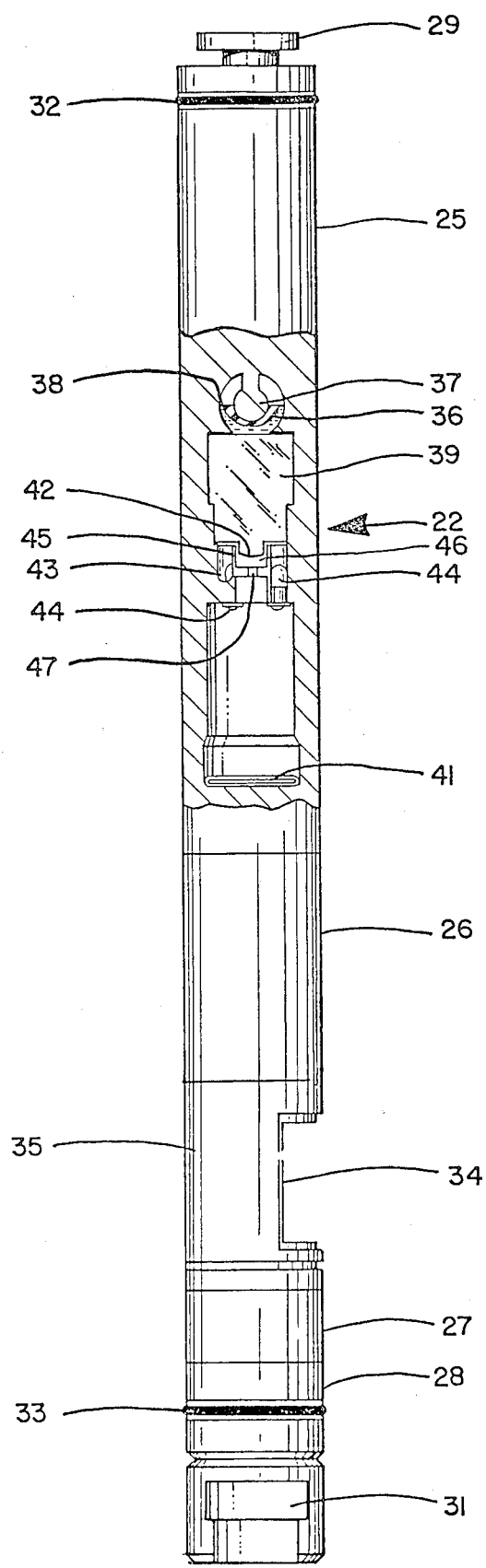
FIG. 2 is a schematic view, partially broken away to illustrate the layout of the azimuth and inclination measurement and photographic recording system of the survey instrument of this invention.

Referring to FIG. 2, the survey instrument indicated generally at 22 includes a tubular housing made up of a plurality of housing sections 25, 26, 27 and 28. At the upper and lower ends of the body, there are provided connector means 29 and 31 for connecting the body to additional tools having complementary connector means so that multiple survey instruments may be run and the instruments may be connected to shock absorber means (not shown) for protecting the instrument.

For further protecting the instrument, there are provided adjacent the upper and lower ends of the instrument annular resilient members 32 and 33 which center the instrument within the pressure barrel and protect it against lateral shock.

The housing has a window 34 therein and a rotatable cover or shield 35 which is shown in the open position and which may be rotated about 180° to a position covering the window 34. The window 34 has a number of electrical contacts therein which are utilized to mate with a hand-held detachable programming and test unit 53 which is hereafter described in detail in connection with the circuit diagram of FIG. 7, and which cooperates with the circuitry illustrated in FIG. 8 and located within the instrument housing.

An azimuth and vertical deviation angle indicating unit includes a hemispherical indicating member 36 having indicia on the lower surface thereof indicating both attitude and azimuth. Indicating member 36 is floated in a liquid 38 and held in a centered position by a post 37. The lower end of the post 37 is a spherical ball against which the indicating member 35 bears. Indicating member 36 is designed to use the surface tension of the liquid 38, which will cause indicating member 36 to remain level with the surface and thus be constantly indicative of the earth's gravity and thus vertical, and is magnetized like a compass card to be magnetically driven to a predetermined orientation with respect to magnetic north. Thus, as the tool is tilted from the vertical, the indicating member 36 will move about the end of post 37 so that its upper surface remains horizontal and, of course, parallel to the level of liquid 38, and will rotate about the end of post 37 to maintain at all times its position relative to the magnetic field of the earth. The housing of the tool as well as the pressure barrel and the portion of the drill pipe in which the tools is loaded are fabricated from non-magnetic material to the extent necessary to prevent their interfering with proper response of the indicating means to the earth's magnetic field.

A cylindrical body 39 forms the lower wall of the chamber which contains the floatation liquid 38. Body 39 is formed of a glass material having an index of refraction which is substantially the same as the index of refraction of the liquid 38. For instance, body 39 may be ground from crown glass and the liquid may be perchloroethylene with the glass and liquid having substantially the same index of refraction. If the glass and liquid are of the same index of refraction, there is no reflection or bending of light rays as they pass from the indicia on the indicating member 36 through the interface between the glass and liquid. Small differences in the refractive index result in some bending of the light rays which is acceptable. Where the indexes of refraction are different, they should be selected to provide the most parallel rays through body 39 traveling away from indicating member 36, i.e., the liquid should have a lower index of refraction than the solid medium. In other words, the relative index of the two media is preferably zero and if the relative index is not zero, the relative index between the crown glass and liquid is preferably such that as the light is passed back into the crown glass, it is bent toward the normal.

While the spacing of the indicating member 36 from body 39 is not critical, best results will be obtained if the spacing is less than one hundred thousandths (0.100) of an inch, and is preferably on the order of thirty thousandths (0.030) of an inch, for purposes which will hereafter be set forth in greater detail.

A source of light for momentarily illuminating the indicia on indicating member 36 is provided by three light bulbs 44, only one of which is illustrated in the drawings, which are disposed symmetrically about an annular, upwardly facing reflective groove 43 having a curved bottom. The curved bottom of groove 43 is preferably finished with a high polish so that it will reflect light upwardly through the body 39.

Cylindrical body 39 is preferably constructed to function as a light pipe to efficiently direct diffused or distributed light to illuminate the indicia on indicating member 36. Thus, body 39 preferably has a finish around its cylindrical surface to direct light along the longitudinal axis of the cylindrical body.

A lens 42 is provided to focus the image of the illuminated indicating member 36 onto film 41. To reduce as much as possible problems incident to reflection and bending of light rays due to interfaces between media having different indexes and refraction, it is preferred that the lens 42 be formed on the lower end of the solid body 39, and to also eliminate the need for separate lens mounting, the space for separate lens, and reduce the cost of materials. The lens portion 42 of body 39 is provided on a centrally located downwardly projecting test on body 39 which projects into the bore 46 thus shielding the lens from direct rays of light from the bulbs 44 and reflective groove 43. An aperture 47 is formed at the lower end of the bore 46 and functions in the usual manner to circumscribe the image projected onto the film 41.

Referring now to the details of FIGS. 5A through 5G, the housing includes the upper sub 68 (FIG. 5A), lower sub 69 (FIG. 5G) and its attaching collar 76 interconnected by the several tubular body sections and connectors 72 through 77. The upper sub 68 carries the upper connector 78 and the centralizer and lateral shock absorber assembly provided by ring 79 and the associated three O-rings 81, 82 and 83, and the lower sub 69 carries a similar assembly indicated generally by the reference numeral 138.

Body section 72 has a circumferential wall 84 which forms the lower portion of the cavity for the liquid 38. An upwardly facing circumferential shoulder 84a positions the lower end of a plug 85 which carries post 37 which, as previously described, has a spherically shaped lower end. The plug 85 has a pair of ports 86 and 87 which are closed by screws 88 and 89. These ports provide a means for filling the chamber with the proper amount of fluid 38 to surround and float indicating member 36 at precisely the calibrated level to provide a uniform gap between indicating member 36 and post 37. The lower end of the plug 85 is centered within the housing by the precision with which the shoulder 84a and the mating lower end of plug 85 are disposed at a right angle to the axis of the bore in the body section 72 and the close fit between lower portion of plug 85 and the surrounding portion of body section 72 when the externally threaded nut 91 is used to press plug 85 against shoulder 84a.

As described, the indicating member 36 has indicia on its lower face to indicate azimuth direction and extent of inclination of the tool. To align the indicating member 36 with the earth's magnetic field, the indicating member 36 is provided with a wire like magnet 36a embedded in its upper surface so that the indicating member 36 is in effect a floating compass card. Indicating member 36 has a concave hemispherical configuration to mate with the spherical end of the post 37 and to provide a gap of constant width as the indicating member 37 moves freely relative to the end of post 37 as the body section 72 moves relative to the horizontal and rotates about the vertical axis, i.e., the spacing between the lowermost section of the indicating member 36 and the upper surface of the cylindrical body 39 is preferably about thirty thousandths (0.030) of an inch. As indicating member 36 rotates in azimuth, it is designed to float with the top edge located at the surface of the liquid 38 so that the surface tension of the liquid 38 will provide a relatively strong force to hold indicating member 36 centered on post 37 and also to rotatably drive indicating member 36 to the horizontal position represented by the surface of liquid 38. A reticle, typically a circle with an asymmetrical crows foot centered over the circle, is etched on the top surface and precisely aligned on the central axis of the cylindrical body 39. This positions the reticle very close to the indicia on the lower face of indicating member 36 to provide good accuracy and simultaneously provide a minimum field of depth for the image to be focused on the film 41.

The reticle (not shown) on the top surface 39a of cylindrical body 39 is precisely positioned on the axis of body section 72 in alignment with the axis of the post 37 and hence with that of the indicating member 36 by resilient O-ring 94 and to a lesser degree by O-ring 97. The alignment of the lens 42 at the lower end of the body 39 is not critical and any aligning function of the lower O-ring 97 is incidental. The O-ring 97 does, however, protect the body 39 from shock and also provides a fluid seal.

The connector 73 forms a holder for the light source of the exposure of the film 41. For this purpose, an upwardly facing reflective annular groove 43 is formed in the upper end of connector 73 to provide a concave annular reflector. Three light bulbs 44, only one of which is illustrated, are received in bores extending through the bottom of groove 43 at equally spaced intervals around the groove. Groove 43 is provided by an internal upstanding annular wall 45 around a central bore 46 into which the lens 42 extends to shield the lens from direct light from the light source. The combination of the reflective groove 43 and the inwardly reflective side walls of the cylindrical body 39 efficiently direct all light toward the indicia on indicating member 36. The diverse paths of the light from each bulb results in diffused illumination of the indicia, even when one or two bulbs have failed, thus insuring that a readable photograph is obtained.

The connector 73 also has a small aperture 47 positioned below the lens 42 to prevent spurious light from passing into the barrel between the lens 42 and the film 41 which might cloud the exposure.

An insulating sleeve 101 is secured at its upper end to the body section 74 and has a tubular metal sleeve depending therefrom and held out of contact with the body section 74. A spring 103 is compressed during assembly and urges a contact 104 firmly against the contacts of the light bulbs 44 to hold the light bulbs in their sockets and to conduct electric current thereto, the electrical path being completed through the flanges of the bulbs to the connector 73.

The disc shaped film 41 has an annular metal ring 105 with a U-shaped cross-section crimped about its periphery to transmit current from the film support 99 to conductive sleeve 102.

The film loading portion of this invention is shown in FIG. 5C. The film support 99 is reciprocally mounted in the insulating sleeve 106 and is urged upwardly by the compression spring 107 which is disposed in an enlarged section of the insulating sleeve 106. The film support 99 carries a cup-shaped rubber or plastic member 108 which receives and surrounds the film disc 41. This cup member 108 functions to maintain the interior of the instrument light tight and to prevent light from entering through either the alignment port 109 or the film loading slot 110 when the film support 99 and cup member 108 are in the position illustrated. A film loading slot 110 in body section 74 extends circumferentially about the instrument a sufficient distance to permit the passage of the film disc 41. The light tight cup member 108 has a circumferentially extending slot 111 to permit passage of the film 41 into the cup of the light tight cup member 108 when the film support 99 is rotated to align slot 111 with slot 110.

When loading the instrument, the body section 76 is unthreaded from the lower end of connector 75 exposing the lower end of the film support rod 99.

The film support 99 is then grasped and pulled downwardly within connector 75 until the pin 112 carried by the film support 99 clears slot 113 in the lower end of the insulating sleeve 106. The film support 99 is then rotated until the pin 112 strikes a stop (not shown) to indicate that the film slot 111 in the light tight cup member 108 is in alignment with film slot 110 in body section 74. With slots 110 and 111 in alignment, the film 41 may be injected from a standard film loading device through the two slots. The film loading device, not illustrated, is brought into light tight engagement with body section 74 and cup member 108. A pin on the film loader projects into the locator port 109 to properly align the two structures and film 41 is ejected from the loader into the instrument. A similar instrument may be utilized to remove film 41 or the film 41 may be removed in a dark room. After film 41 is loaded, the film support 99 is rotated until the pin 112 again moves into slot 113 and the spring 107 moves the film support 99 upwardly and holds the film against the conductive sleeve 102 thereabove. The body section 74 is then threadedly connected to connector 75. The metal ring 105 around the film 41 provides an electrical path between the conductive sleeve 102, and the film support 99.

An insulating member 114 within the body section 76 carries a spring support 115 and spring 116 which is compressed between the support 115 and a follower 117 which engages the lower end of the film support 99. The insulating member 114 has a reduced diameter bore through which the bolt 118 extends and a nut 119 on the lower end of the bolt firmly engages the end of electrical conductor 120 to provide an electrical path between the conductor 120, bolt 118, and spring support 115 to provide for flow of current upwardly through bolt 118, support 115, spring 116 and follower 117 to the film support 99. The lower end of conductor 120 is connected to a contact on a circuit board 49. Thus, an electrical path insulated from the housing is provided from the circuit board 49 through conductor 120, bolt 118, support 115, spring 116, follower 117, film support 99, the metal ring 105 of film 41, conductive sleeve 102, spring 103 and bulb contact 104 to the bulbs 44.

The circuit board 49 is located within the body section 76, and carries a circuit such as disclosed in FIG. 8. The circuit includes timing means, which, when programmed and started, connects the power source (hereafter described) to the light bulbs 44 after a predetermined delay period, and will maintain the bulbs illuminated for a predetermined interval of time to expose the film. The circuit means on the circuit board also includes means associated with the programming and test unit for testing and indicating the condition of the power source and of the bulbs. Once the timing means has been programmed and the start button is depressed, an indicator light 123 on the circuit board 49 will indicate to the operator that the timing means has been activated and is running.

The circuit board 49 is held between insulated spacer block 124 on one side and the upper insulating spacer 125 and the lower insulating spacer 126 on the other side. The sheet of plastic 127 between the board and spacer block 124 together with the upper and lower spacers 125 and 126 also provide a resilient shock mounting for the circuit board 49.

Power to the circuit board 49 and thus to the light bulbs 44 is supplied by conductor 128 which runs along the board 49 and is in electrical contact therewith. Preferably, current is delivered directly through the conductor 128 to the light bulbs 44. The timing means controls the flow of current along conductor 128 to light bulbs 44.

After the instrument has been programmed, a cover or shield 35 may be rotated to close the window 34. The O-ring 129 frictionally retains the cover 35 in any set position relative to the window 34.

The power supply for the instrument as well as the programming and test unit 53 is provided by several batteries, two of which are shown at 131 and 132, for supplying power to the conductor 128. Power from the batteries is passed through the plunger 133 and compression spring 134 to the follower 135 which is urged by the spring 134 against the contact member 136 to which the conductor 128 is attached. The batteries are urged firmly against each other and against plunger 133 by a compression spring 137 and contact 137a. The spring 137 is grounded to the housing to complete the electrical circuit.

Referring once again to FIGS. 3A, 3B and 4, the hand-held programming and test unit is indicated generally by the reference number 53. A plurality of electrical contacts 48 are formed on the circuit board 49 and exposed through the window 34 in the tool housing when the cover 35 is rotated to the open position illustrated in FIG. 3A.

Figure 3:
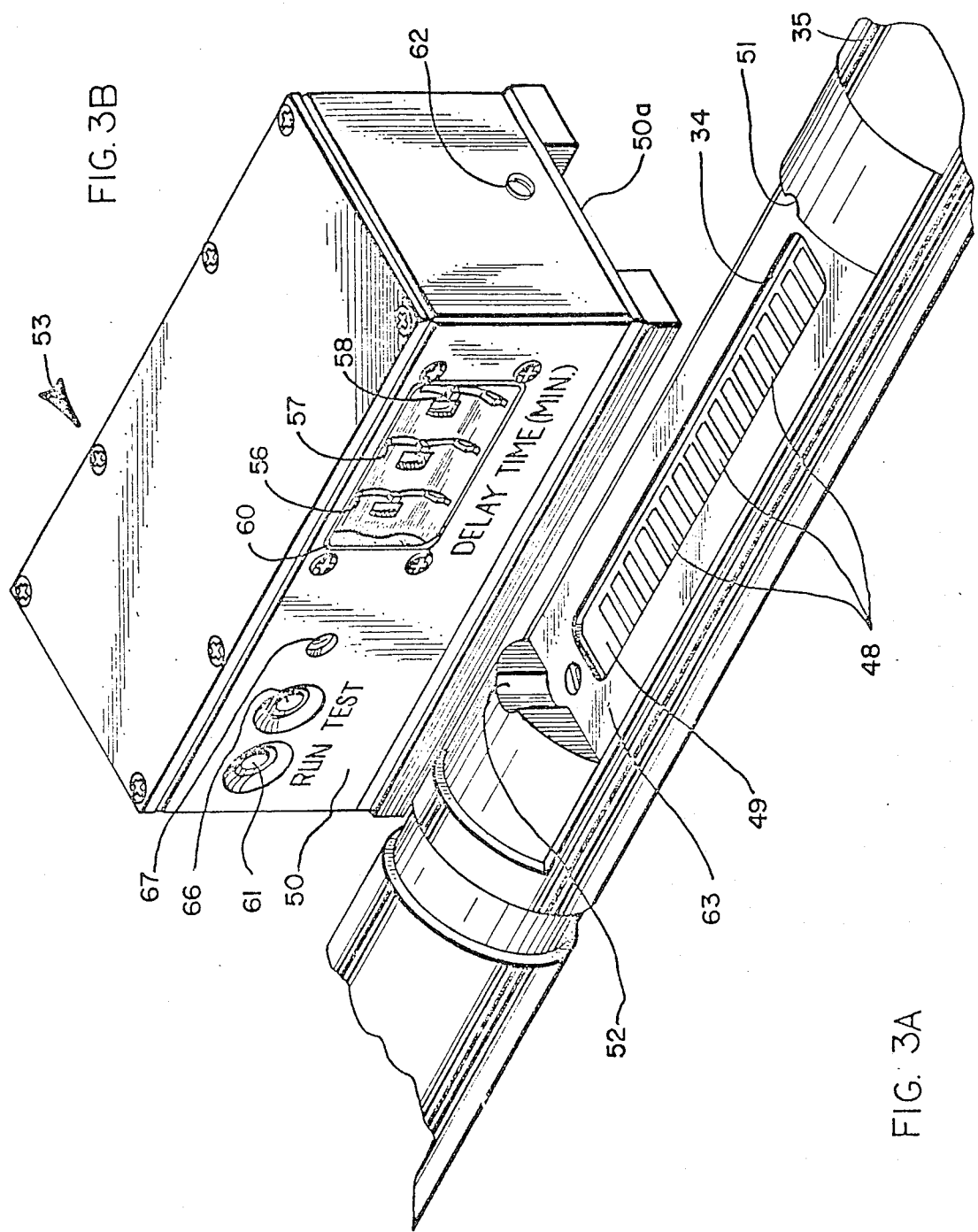
FIG. 3A is an isometric view of a portion of the survey instrument which is to be mated with a programming and test unit in accordance with the present invention.
FIG. 3B is an isometric view of the programming and test unit of this invention positioned immediately above the contacts of FIG. 3A so that movement of the programmer toward the instrument will bring the programming and test unit into engagement with the contacts of the instrument.
Figure 4:
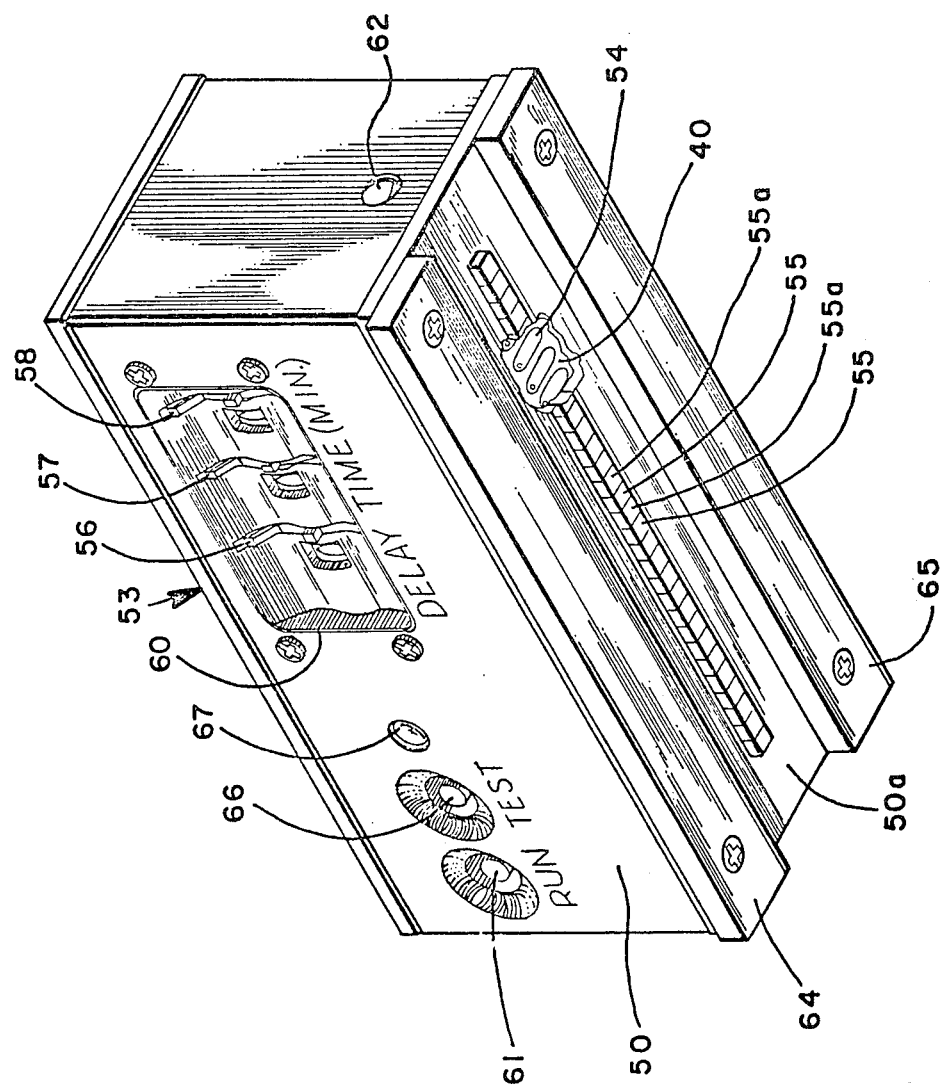
FIG. 4 is an isometric view from below and to the side of the programming and test unit.

Semi-circular, radially extending grooves 51 and 52 in the body at opposite ends of the window 34 receive protrusions 62, only one of which is illustrated in FIG. 3A, to guide the programming and test unit 53 into proper registration with the instrument.

The programming and test unit 53 has a plurality of electrical contacts 54 which are spaced to mate with the contacts 48 in the instrument. A strip of resilient material having alternate sections 55 and 55a which are conductive and non-conductive, respectively, extending along the body over the contacts 54. The strip may be made of silicon rubber with the conductive sections being carbon filled. While there are more conductive sections with the resilient strip than there are contacts, at least one conductive section of the resilient strip will be in engagement with each of contacts 54 and a non-conductive section will bridge between adjacent contacts 54 so that the strip of conductive and non-conductive resilient materials in effect become extensions of the contacts 54 while providing functional resiliency therefor.

Three conventional decimal to binary encoding switches 56, 57 and 58 which may be rotated by hand are mounted in the programming and test unit 53. The outputs from these switches are connected to selected contacts 54 as will presently be described in connection with FIGS. 7 and 8. The actuator wheels of switches 56, 57 and 58 are exposed to the exterior of the housing 50 through a window 60 for access by the operator.

A run button 61 is provided on the unit 53 to activate the program, after the encoding switches 56, 57 and 58 have been set and the programming and test unit 53 has been placed in position to initiate the loading and run sequence as will presently be described.

A flat section 63 of the instrument is exposed by the cover 35 and is sized to mate with a flat surface 50a on the programming and test unit 53. When so engaged, the resilient contacts 55 and 55a will extend through the window 34 in the instrument and are compressed to provide good electrical contact. Strips 64 and 65 are provided on each side of the surface 50a and project beyond the resilient strip contacts 55 and 55a so that when the programming and test unit 53 is placed on a flat surface, the resilient contacts 55 and 55a will be spaced from the surface by strips 64 and 65 to protect the contacts.

The programming and test unit 53 also includes a test switch 66 and a test indicator light 67. Suitable circuitry is provided such that when the button 66 is depressed, the indicator light 67 will only illuminate when the set of batteries is adequate and all three bulbs are functional as will presently be described in connection with the circuits illustrated in FIGS. 7 and 8.

Referring now to FIG. 7, there is depicted a schematic diagram of the circuitry of programming and test unit 53 of the present invention. Those skilled in the art will appreciate upon reference to FIG. 7 that programming and test unit 53 is an entirely passive device which derives all of its operating power from the borehole survey instrument 22 and which alters the setting of the timing and test circuitry within borehole instrument 22 by the selective application of ground potential. As discussed herein, a plurality of electrical contacts 54 are coupled to borehole survey instrument 22 through a conductive elastomer 55 disposed in bottom plate 302. In the embodiment disclosed, electrical contacts 54 include eighteen separate contacts labeled A-R. As a matter of design choice, twelve of these contacts, B-E; I-L; and N-Q are coupled to switch module 304. Switch module 304 includes three decimal to binary switches 56, 57 and 58 which are utilized by the technician to set the desired delay time before the film is to be exposed.

Contact 54R is coupled to ground potential within borehole survey instrument 22 and provides ground potential to switches 56, 57 and 58 within switch module 304 and to the emitter of transistor 306. Similarly, contact 54A is coupled to the battery potential within borehole survey instrument 22 and provides forward bias to the base of transistor 306 through the voltage divider network comprised of resistors 308 and 310.

Thus, in order for a conductive path to ground to exist for light 67, test switch 66 and run switch 61, contacts 54A and 54R of programming and test unit 53 must be properly mated to borehole survey instrument 22 to provide forward bias for transistor 306. In this manner, the technician can be assured that proper electrical contact is present between programming and test unit 53 and borehole survey instrument 22 prior to the setting of the desired delay time.

As can be seen from the schematic diagram of FIG. 7, depression of test switch 66 will cause contact 54H to be coupled to contact 54R through the collector-emitter circuitry of transistor 306, if transistor 306 is forward biased. Similarly, depression of run switch 61 will cause conductor 54F to be coupled to conductor 54R through the collector-emitter circuit of transistor 306. Additionally, the signal from borehole survey instrument 22 which indicates that the bulbs and batteries are in satisfactory condition is coupled to light 67 from contact 54G and through the collector-emitter circuitry of transistor 306 to ground potential at conductor 54R. In this manner, none of the functions of programming and test unit 53 may be accomplished unless contacts 54A and 54R are properly mated with borehole survey instrument 22, thus ensuring proper electrical contact between programming and test unit 53 and borehole survey instrument 22.

Referring now to FIG. 8, there is depicted a schematic diagram of the timing and test circuitry included on circuit board 49. Electrical power for the depicted timing and test circuitry is provided by batteries 131 and 132 which are isolated from certain of the transient voltage levels present in the timing and test circuitry by means of diode 202 and capacitor 204.

The primary timer utilized to determine the time delay prior to operation of the photographic equipment in borehole survey instrument 22 is comprised of serially connected counters 206, 208 and 210, which are implemented utilizing presettable four bit up/down counters. Each of the counters depicted may be preset to a desired value by inputs at pins J1, J2, J3 and J4, utilizing the outputs of decimal to binary switches 56, 57 and 58. (see FIGS. 3A, 3B and 4) Those skilled in the art will appreciate that such four bit counters may be utilized to count in either a binary mode or in a decimal mode utilizing binary coded decimal numbers such as those provided by switches 56, 57 and 58. Therefore, with four bits in each counter, in the binary coded decimal mode, the composite timer created by serially connected counters 206, 208 and 210 can easily be utilized to count up to or down from a binary coded decimal number of between one and nine hundred and ninety-nine. In the embodiment disclosed, counters 206, 208 and 210 count down from the preset value to determine the time delay prior to operation of the photographic equipment.

A fourth presettable four bit up/down counter 212 is utilized to provide a timer to control the time of exposure of the film within borehole survey instrument 22. In the illustrated embodiment this timer is hard wired to a selected exposure time by means of jumper wires on board 214; however, in alternate embodiments, it is possible to control counter 212 to automatically vary the exposure time to compensate for variations in lighting due to a factor such as bulb failures.

Clocking pulses for each of the above-referenced counters are provided by a clock circuit which includes fourteen stage ripple carry binary counter 216 which is driven, in a conventional manner, by crystal oscillator 218. One output of counter 216 is applied to divider 220 to be divided down into usable clock units. A first output of divider 220, which approximates one minute in period, is coupled through logic gate 222 to the clock inputs of counters 206, 208 and 210. In this manner, the delay timer disclosed herein can generate a delay of any period from one minute to nine hundred and ninety-nine minutes. A second output of divider 220, which approximates two seconds in period, is applied directly to counter 212 and permits counter 212 to increment or decrement exposure time in two second intervals.

The test circuitry included within borehole survey instrument 22 is enabled by the selective application of ground potential to the "enable" and "test" inputs to logic gate 224. The output of logic gate 224 is then utilized to reset multivibrator 226 and is also applied to the base of transistor 228. The collector of transistor 228 is coupled to transistor 230 which provides the operating voltages to the test circuitry. The voltage applied through transistor 230 is utilized to power comparator circuits 232 and 234 and to bias the inputs of these comparators by means of selected voltage dividers.

A battery test is accomplished utilizing comparator 234 and two voltage dividers. A first reference voltage is provided utilizing the voltage divider formed by resistor 236 and zener diode 238. Those skilled in the art will appreciate that the voltage drop across zener diode 238 will remain relatively constant. The battery voltage is then compared with this reference voltage by means of the voltage divider formed by resistors 240 and 242. If the present battery voltage compares favorably with the reference voltage at zener diode 238, the output of comparator 234 is utilized to forward bias transistor 244, providing power to light emitting diode 123 and to light 67 on programming and test unit 53. (see FIG. 7)

A bulb test is similarly accomplished utilizing comparator 232 and two voltage dividers. The reference voltage divider is formed by resistors 248, 250 and 252. The output voltage of this voltage divider is coupled to the positive input of comparator 232. The negative input of comparator 232 is coupled to the voltage divider formed by resistor 254, diode 256 and the parallel network comprising bulbs 44a, 44b and 44c. Those skilled in the electrical art will appreciate that the equivalent resistance of three bulb filaments in parallel is less than the equivalent resistance of two bulb filaments in parallel and that the equivalent resistance of two bulb filaments in parallel is less than the resistance of a single bulb filament. Thus, if one or more bulbs is burned out, the value of that leg of the aforementioned voltage divider changes substantially and will cause a change in the output of comparator 232. As above, when the comparison of voltages coupled to comparator 232 indicates that all three bulb filaments are intact, the output of comparator 232 will forward bias transistor 244 and provide power to light emitting diode 123 and light 67 on programming and test unit 53. As a matter of design choice, if either the battery or bulb test indicates a fault, transistor 244 will not conduct and the indicating lights will not illuminate, indicating the fault condition.

The operation of the timing circuitry of borehole survey instrument 22 is enabled by the selective application of ground potential to the "enable" and "run" inputs to logic gate 264. The output of logic gate 264 is utilized to set flip-flop 226. One output of flip-flop 226 is utilized to in turn set flip-flop 266. The output of flip-flop 266 is coupled to the preset enable pins of counters 206, 208, 210 and 212, allowing the desired inputs present on pins J1-J4 of each counter to be loaded into each counter. A second output of flip-flop 226 is coupled to both binary counter 216 to start the clocking pulses and to the input of counter 206 to initiate the counting down from the preset value. One output of counter 216 is coupled to the base of transistor 244 and will periodically forward bias that transistor, causing light emitting diode 123 to periodically flash. This circuitry gives the technician a visible indication that the survey instrument is set and that the clock is running. When serially coupled counters 206, 208 and 210 finish counting down and arrive at the zero condition, an output from counter 210 is coupled to both the input of counter 212 to commence timing the exposure of the film and to transistor 268 to energize the lighting circuitry.

Transistor 268 is utilized to forward bias transistor 270 which in turn forward biases field effect transistor 272. The utilization of a field effect transistor to supply current to bulbs 44a, 44b and 44c is an important feature of the present invention since it permits the lighting circuitry to be automatically compensated for bulb failures. Those skilled in the art will appreciate that field effect transistors include a resistive component which will vary the voltage drop across the field effect transistor as the current through the field effect transistor varies. Thus, the failure of one bulb will increase the equivalent resistance of the remaining two parallel bulbs and decrease the current through field effect transistor 272. This decrease in current through field effect transistor 272 decreases the voltage drop across field effect transistor 272 and thereby increases the voltage applied to the remaining bulbs. Indeed, by a careful selection of the resistive characteristics of field effect transistor 272 it is possible to compensate the lighting circuit for the loss of one or two bulbs by actually increasing the amount of current which flows through the remaining bulbs by decreasing total circuit resistance. In this manner, it is possible to compensate the lighting circuitry for the loss of one or two bulbs by substantially increasing the current to the remaining bulbs to provide approximately the same amount of light over a fixed period of time.

As counter 212 completes the timing of the exposure period, its output is coupled through logic gate 274 and is then utilized to reset flip-flop 226. As flip-flop 226 resets, it resets clock 216 and divider 220 and terminates a cycle of operation of borehole survey instrument 22.

FIG. 6 illustrates a low angle indicating unit utilizing the features of the present invention which may be substituted for the high angle unit heretofore described in FIGS. 5A and 5B. The structure is identical except for the body section 72a, which is interchangeable with the body section 72, the centering post 142, and the indicating member 139. Since the low angle unit is designed to measure only relatively small angle deviations from the vertical, the indicating member 139 is designed to have a substantial length between the upper end which is located around the centering post 142 and the lower face 139a which carries the azimuth and deviation indicia. As a result of this increased distance, a slight deviation angle results in a substantially greater lateral displacement of the indicia on the face 139a than is present on the hemispherical indicator of the high angle unit, which is a function of the radius of curvature of the lower face upon which the indicia is scribed. Further, since the indicator 139 is going to be limited to small excursions, the centering post 142 can be cylindrical, rather than spherical. The cylindrical centering post 142 then makes the unit largely immune from errors introduced as a result of changes in the fill level of the fluid. The low angle unit is otherwise assembled, calibrated and operated in the same manner as heretofore described in connection with the high angle unit. Also, the lower face 139a is made flat to simplify the procedures for scribing the indicia thereon without the introduction of significant error.

Although preferred embodiments of the invention have been described in detail, it is to be understood that various changes, substitutions and alterations can be made therein consistent with the spirit and scope of the invention as defined by the appended claims.

We claim:

1. A well survey instrument for recording selected wellbore parameters comprising:
    elongated housing means adapted to be passed through a wellbore;
    indicating means mounted to move within the housing means;
    photographic recording means fixed within the housing means and axially displaced from the indicating means to move with the housing means relative to the indicating means;
    indicia disposed on the indicating means for indicating the angular position of the housing means relative to the indicating means;
    light source means disposed in the housing means for selectively illuminating the indicia;
    optical means for focusing the image of the illuminated indicia on the photographic recording means to record the attitude of the housing with respect to the indicator means;
    electrical power means disposed within said housing means;
    first circuit means disposed within said elongated housing means and electrically coupled to said power means and operable in response to at least one selected electrical signal for performing a function within the elongated housing means, said first circuit means including a first set of electrical contact means on the exterior of the elongated housing means comprised of at least one electrical contact; and
    second housing means separate from the elongated housing means including a second circuit means for generating said at least one electrical signal in response to an operator initiated command, said second circuit means including a second set of electrical contact means which is exposed on the exterior of said second housing means and which comprises at least one electrical contact adapted to be electrically coupled to said at least one electrical contact of said first set of electrical contact means wherein when said first and second set of electrical contact means are coupled to form an electrical path therebetween, said at least one selected input will be operatively coupled to the first circuit means within the elongated housing means to perform the desired function in response to the operator's command.

2. The well survey system of claim 1 wherein:
    said first circuit means includes programmable circuit means for generating a time period of programmably selectable duration; and
    said second circuit means includes manually actuatable binary switch means for programming the programmable circuit means.

3. The well survey system of claim 2 wherein:
    said programmable circuit means includes programmable binary counter means programmable by a plurality of binary input signals; and
    said second circuit means includes a plurality of manually operable binary encoding switches, and said first and second sets of electrical contacts include contact means for connecting each binary encoding switch to said binary counter means.

4. The well survey system of claim 3 wherein:
    said second circuit means further includes manually actuatable run switch means for enabling the programmable circuit means to respond to the binary encoding switches to establish the selected duration; and
    the first circuit means is responsive to the run switch means for receiving the program information.

5. The well survey system of claim 4 wherein:
    said first and second circuit means include means for disabling the loading of binary input signals in the event the complete set of electrical contacts are not establishing electrical contact in a predetermined minimum manner.

6. The well survey system of claim 4 wherein:
    the first circuit means is responsive to the operation of the run switch means to both establish the programmed time period and initiating the start of the time period.

7. The well survey system of claim 6 wherein:
    the first circuit means includes visual indicator means disposed on the first housing means for indicating that the programmable time period is running.

8. The well survey system of claim 2 wherein:
    said first circuit means includes diagnostic means for testing the operability of the power means and wherein
    said second circuit means includes first manually operable switch means for initiating said diagnostic means; and
    visual indicator means on the exterior of one of the housing means for indicating the results of the diagnostic testing.

9. The well survey system of claim 8 wherein:
    the visual indicator means is disposed on said second housing means.

10. The well survey system of claim 3 further characterized by:
    said programmable circuit means initiating energization of the light source means at the end of the period.

11. The well survey instrument of claim 1 wherein:
    said second circuit means is electrically powered from the electrical power means through electrically coupled contacts of the first and second sets of electrical contact means.

12. The well survey instrument of claim 1 wherein:
    the light source means comprises a plurality of individual light sources disposed at spaced intervals around the periphery of the housing and diffuser means for diffusing the light from each individual source to illuminate the indicia whereby the indicia will be fully illuminated even if one bulb fails.

13. The well survey instrument of claim 1 wherein the light source means further comprises:
   an electric voltage source for providing a selected amount of electric voltage;
   a plurality of illuminating means disposed within said housing for illuminating said indicia for a fixed period of time in response to a control signal, each one of said plurality of illuminating means disposed in a position whereby it may fully illuminate said indicia;
   means for coupling less than said selected amount of electric voltage to each one of said plurality of illuminating means; and
   means for increasing the amount of electric voltage coupled to each one of said plurality of illuminating means in response to the failure of one or more said plurality of illuminating means, whereby the total amount of illumination of said indicia during said fixed period of time is not significantly decreased.

14. The well survey instrument of claim 1 wherein the light source means comprises:
   a plurality of illuminating means disposed within said housing for illuminating said indicia in response to the application of a selected amount of electric current to each of said plurality of illuminating means; and
   illumination circuit means for increasing said selected amount of electric current to each illuminating means in response to a malfunction of one or more of said plurality of illuminating means.

15. A well survey instrument according to claim 14 wherein said illumination circuit means includes:
   a resistive device connected in series between an electrical power source and three substantially identical incandescent bulbs electrically coupled in parallel whereby a decrease in the equivalent resistance of said three bulbs as a result of the failure of one will increase the current through the remaining operative bulbs.

16. A well survey instrument according to claim 15 wherein said illumination circuit means further includes:
   switching means connected in series between said electrical power source and said three substantially identical incandescent bulbs electrically coupled in parallel for coupling electric current to said three bulbs.

17. The well survey instrument of claim 16 wherein the light source means further comprises:
   a field effect switching device having a selected resistive characteristic electrically coupled in series with said plurality of parallel coupled illuminating means whereby an increase in the equivalent resistance of said plurality of parallel coupled illuminating means due to the failure of at least one of said plurality of parallel coupled illuminating means will increase the amount of electric current applied to each remaining one of said plurality of parallel coupled illuminating means.

18. The well survey instrument of claim 14 wherein: said illumination circuit means is further characterized by:
   means for detecting a malfunction of one or more of said plurality of illuminating means; and
   visual indication means electrically coupled to said first illumination circuit means and observable outside of said housing for producing a visual indication of a malfunction of said illuminating means.

19. The well survey instrument of claim 1 wherein:
   said electrical power source comprises battery means and further characterized by:
   battery circuit means disposed within the housing for detecting a low charge level on the battery means which includes means for maintaining a substantially constant reference voltage despite substantial variations in the output of said battery means.

20. A wellbore survey instrument for recording selected wellbore parameters said instrument comprising:
   elongated housing means adapted to be lowered into a wellbore;
   indicating means mounted to move within said housing means;
   photographic recording means fixed within said housing means and axially displaced from said indicating means;
   indicia disposed on said indicating means facing said photographic recording means for indicating the angular position of said indicating means with respect to said housing means;
   an electric voltage source for providing a selected amount of electric voltage;
   a plurality of illuminating means disposed within said housing means for illuminating said indicia for a fixed period of time in response to a control signal, each one of said plurality of illuminating means disposed in a position whereby it may fully illuminate said indicia;
   means for coupling less than said selected amount of electric voltage to each one of said plurality of illuminating means;
   means for increasing the amount of electric voltage coupled to each one of said plurality of illuminating means in response to the failure of one or more said plurality of illuminating means, whereby the total amount of illumination of said indicia during said fixed period of time is not substantially decreased; and
   optical means for focusing the illuminated image of said indicia on said photographic recording means.

21. A wellbore survey instrument for recording selected wellbore parameters said instrument comprising:
   elongated housing means adapted to be lowered into a wellbore;
   indicating means mounted to move within said housing means;
   photographic recording means fixed within said housing means and axially displaced from said indicating means;
   indicia disposed on said indicating means facing said photographic recording means for indicating the angular position of said indicating means with respect to said housing means;
   a plurality of illuminating means disposed within said housing means for illuminating said indicia in response to the application of a selected amount of electric current to each of said plurality of illuminating means;
   circuit means for increasing said selected amount of electric current in response to a malfunction of one or more of said plurality of illuminating means; and
   optical means for focusing the illuminated image of said indicia on said photographic recording means.

22. A wellbore survey instrument according to claim 21 wherein:
said plurality of illuminating means comprises three substantially identical incandescent bulbs electrically coupled in parallel and disposed at spaced intervals within said housing means between said photographic recording means and said indicating means.

23. A wellbore survey instrument according to claim 24 wherein said circuit means includes:
a resistive device connected in series between an electrical power source and said three substantially identical incandescent bulbs electrically coupled in parallel whereby, an increase in the equivalent resistance of said three bulbs will decrease the electrical current through said resistive device.

24. A wellbore survey instrument according to claim 23 wherein said circuit means further includes:
switching means connected in series between said electrical power source and said three substantially identical incandescent bulbs electrically coupled in parallel for coupling electric current to said three bulbs.

25. A wellbore survey instrument for recording selected wellbore parameters said instrument comprising:
elongated housing means adapted to be lowered into a wellbore;
indicating means mounted to move within said housing means;
photographic recording means fixed within said housing means and axially displaced from said indicating means;
indicia disposed on said indicating means facing said photographic recording means for indicating the angular position of said indicating means with respect to said housing means;
a plurality of parallel coupled illuminating means disposed within said housing means for illuminating said indicia in response to the application of a selected amount of electric current to each of said plurality of illuminating means;
a field effect switching device having a selected resistive characteristic electrically coupled in series with said plurality of parallel coupled illuminating means whereby an increase in the equivalent resistance of said plurality of parallel coupled illuminating means due to the failure of at least one of said plurality of parallel coupled illuminating means will increase the amount of electric current applied to each remaining one of said plurality of parallel coupled illuminating means; and
optical means for focusing the illuminated indicia on said photographic recording means.

26. A wellbore survey instrument for recording selected wellbore parameters said instrument comprising:
elongated housing means adapted to be lowered into a wellbore;
indicating means mounted to move within said housing means;
photographic recording means fixed within said housing means and axially displaced from said indicating means;
indicia disposed on said indicating means facing said photographic recording means for indicating the angular position of said indicating means with respect to said housing means;
a plurality of illuminating means disposed within said housing means for illuminating said indicia for a selected period of time;
optical means for focusing the illuminated image of said indicia on said photographic recording means;
an electrical power source mounted within said housing means for providing electrical power to said plurality of illuminating means;
first means disposed within said housing means for detecting a malfunction of one or more of said plurality of illuminating means;
second means disposed within said housing means for detecting a malfunction of said electrical power source; and
visual indication means electrically coupled to said first means and said second means and observable outside of said housing means for producing a visual indication of a malfunction of either of said illuminating means or said electrical power source.

27. The wellbore survey instrument of claim 26 wherein:
said electrical power source comprises a battery and wherein said second means includes means for maintaining a substantially constant reference voltage despite substantial variations in the output of said battery.

28. The wellbore survey instrument of claim 27 wherein:
said second means further includes means for comparing a fixed portion of the output of said battery with said substantially constant reference voltage.

29. A wellbore survey instrument for recording selected wellbore parameters said instrument comprising:
elongated housing means adapted to be lowered into a wellbore;
indicating means mounted to move within said housing means;
photographic recording means fixed within said housing means and axially displaced from said indicating means;
indicia disposed on said indicating means facing said photographic recording means for indicating the angular positon of said indicating means with respect to said housing means;
a plurality of illuminating means disposed within said housing means for illuminating said indicia for a selected period of time;
optical means for focusing the illuminated image of said indicia on said photographic recording means;
an electrical power source mounted within said housing means for providing electrical power to said plurality of illuminating means;
first means disposed within said housing means for detecting a malfunction of one or more of said plurality of illuminating means;
visual indication means electrically coupled to said first means and said second means and observable outside of said housing means for producing a visual indication of a malfunction of said illuminating means.

* * * * *